United States Patent [19]

Howard

[11] 4,052,224
[45] Oct. 4, 1977

[54] TREATMENT OF PIGMENT

[75] Inventor: Peter Barry Howard, Yarm, England

[73] Assignee: Tioxide Group Limited, Billingham, England

[21] Appl. No.: 692,905

[22] Filed: June 4, 1976

[30] Foreign Application Priority Data

July 17, 1975 United Kingdom ............... 30049/75

[51] Int. Cl.² ................................................ C09C 1/36
[52] U.S. Cl. .................................. 106/300; 106/308 B
[58] Field of Search ............................ 106/300, 308 B

[56] References Cited
U.S. PATENT DOCUMENTS

| 3,497,373 | 2/1970 | Rieck et al. | 106/300 |
| 3,515,566 | 6/1970 | Moody et al. | 106/300 |
| 3,556,828 | 1/1971 | Durrant et al. | 106/300 |
| 3,567,479 | 3/1971 | Portes et al. | 106/300 |

Primary Examiner—Patrick P. Garvin
Assistant Examiner—J. V. Howard
Attorney, Agent, or Firm—Schuyler, Birch, Swindler, McKie & Beckett

[57] ABSTRACT

A process for the treatment of titanium dioxide pigment which involves adding to a pigment slurry a compound of phosphorus, of aluminium, of zirconium, of titanium and of silicon, adjusting the pH of the slurry to a value of from 3.5 to 4.5, followed by adding to the slurry a compound of phosphorus of an alkaline reacting compound of aluminium prior to the addition of mineral acid to adjust the pH of the slurry to a value of 6.5 to 8.

20 Claims, No Drawings

TREATMENT OF PIGMENT

This invention relates to a process for the treatment of a pigment and in particular to the treatment of titanium dioxide pigment.

In accordance with the present invention a process for the treatment of titanium dioxide pigment comprises forming an aqueous dispersion of pigmentary titanium dioxide containing a water-soluble compound of phosphorus in an amount of from 0.2 to 1.0% by weight expressed as $P_2O_5$, adding to the dispersion so formed an acidic water-soluble compound of aluminium in an amount of from 2.5 to 3.5% by weight expressed as $Al_2O_3$, a water-soluble acidic compound of zirconium in an amount of from 0.5 to 1.5% by weight expressed as $ZrO_2$, an acidic water-soluble compound of titanium in an amount of from 1.5 to 3% by weight expressed as $TiO_2$ and a water-soluble compound of silicon in an amount of from 0.2 to 2.0% by weight expressed as $SiO_2$, adjusting the pH of the dispersion to a value of from 3.5 to 4.5, and then adding to the dispersion a water-soluble compound of phosphorus in an amount of from 0.2 to 1.0% by weight expressed as $P_2O_5$ and an alkaline reacting water-soluble compound of aluminium in an amount of from 0.5 to 1.5% by weight expressed as $Al_2O_3$, all the percentages by weight being based on the weight of $TiO_2$ in the pigment, and adding to the dispersion a mineral acid to adjust the pH to a value of 6.5 to 8 and recovering the treated pigment.

The present invention provides a process for the treatment of titanium dioxide pigment in such a manner that there becomes associated with the pigment a number of hydrous metal oxides so that the pigment when incorporated in a paint has reduced photochemical activity. The titanium dioxide pigment which is treated by the process of the present invention is preferably a "sulphate" pigment, i.e. a calcined titanium dioxide pigment which is prepared by the well known "sulphate" process which involves the digestion of titaniferous ore with a concentrated sulphuric acid to produce a digestion cake which is then dissolved in water or dilute acid. The solution of titanyl sulphate so obtained, after suitable purification treatment, is hydrolysed in the presence of seed nuclei to precipitate a hydrous form of titanium dioxide which is subsequently calcined at an elevated temperature to develop the pigmentary properties of the titanium dioxide.

Preferably the titanium dioxide pigment which is treated by the process of the present invention is rutile titanium dioxide containing at least 95% of its $TiO_2$ content in the rutile form as opposed to the anatase form.

Preferably also the titanium dioxide pigment to be treated by the process of the invention contains from 0.1 to 0.5% by weight $Al_2O_3$ based on the weight of $TiO_2$. This alumina is formed during the calcination process as a result of the addition to the titanium dioxide pigment prior to calcination of an aluminum compound such as aluminium sulphate.

Usually prior to treatment by the process of the present invention the pigmentary titanium dioxide calciner discharge is milled in a dry milling process such as by means of a ring or roller mill or hammer mill. The pigment to be treated is then formed into an aqueous dispersion using a water-soluble compound of phosphorus as a dispersant, such as for example, a solution of an alkali metal polyphosphate such as sodium hexametaphosphate, which may also contain an alkali such as sodium hydroxide, and then wet milled preferably by means of a sand mill. The amount of the water-soluble compound of phosphorus used is form 0.2 to 1% by weight expressed as $P_2O_5$ on the weight of $TiO_2$. It is desirable that the aqueous dispersion should have an alkaline pH and amounts of an alkali, e.g. caustic soda added to the dispersion with the water-soluble compound of phosphorus are such as to produce an alkaline slurry or aqueous dispersion, e.g. one having a pH of about 9. Usually the concentration of the titanium dioxide pigment in the dispersion at the conclusion of wet milling will be from 600 to 1000 grams per liter, although this will depend on the particular process conditions employed in a particular factory. Subsequent to wet milling it is desirable to reduce the concentration of a titanium dioxide pigment in the slurry to a value of from 150 to 250 grams per liter. In addition, the temperature of the dispersion prior to carrying out the subsequent treatment stages is usually raised to a value of from 40° to 65° C, preferably about 45° C.

To the aqueous dispersion of pigmentary titanium dioxide containing the water-soluble compound of phosphorus there is then added an acidic water-soluble compound of alumina in an amount of from 2.5 to 3.5% by weight expressed as $Al_2O_3$ on the weight of $TiO_2$. Preferably the amount of water-soluble compound of aluminium is from 2.8 to 3.2% by weight expressed as $Al_2O_3$ on the weight of $TiO_2$. Any acidic water-soluble salt of aluminium which is hydrolysable to form a hydrous oxide of aluminium may be employed in the process in the present invention, and typical examples are aluminium chloride, aluminium nitrate and aluminium sulphate. The aqueous solution of aluminium sulphate is preferred.

An acidic water-soluble compound of titanium is also added to the aqueous dispersion containing the water-soluble compound of phosphorus, and the amount of the compound of titanium is from 1.5 to 3% by weight expressed as $TiO_2$ on the weight of $TiO_2$ in the pigment. Preferably the amount of water-soluble compound of titanium is from 1.8 to 2.4% by weight as $TiO_2$. Any acidic water-soluble compound of titanium which is hydrolysable to form a hydrous oxide ot titanium may be employed in the process of the present invention, and typical examples are titanium tetrachloride and titanyl sulphate. Usually the titanium compound will be added in the form of an aqueous solution.

A water-soluble acidic compound of zirconium in an amount of from 0.5 to 1.5% by weight expressed as $ZrO_2$ on $TiO_2$ in the pigment is also added to the aqueous dispersion containing the water-soluble compound of phosphorus. Preferably the amount of the acidic compound of zirconium which is added is from 0.8 to 1.2% by weight expressed as $ZrO_2$ on the weight of titanium dioxide in the pigment. Any acidic water-soluble salt of zirconium which is hydrolysable to form a hydrous oxide of zirconium may be employed in the process of the present invention, and typical examples are zirconium nitrate and zirconium sulphate. Usually the acidic compound of zirconium is added to the aqueous dispersion in the form of an aqueous solution.

Preferably the water-soluble compound of aluminium, the water-solulbe compound of zirconium and the water-soluble compound of titanium are added in the form of a mixed solution of the sulphate of the metals. Such a solution contains aluminium sulphate, titanyl sulphate and zirconium sulphate in sulphuric acid, and has a pH of between 0.7 and 1.2. The mixed solution when used is added to the aqueous dispersion over a period of say 15 to 45 minutes, and after the addition the aqueous dispersion is agitated to produce a homogeneous dispersion.

Subsequently to the addition of the water-soluble salts mentioned there is added to the aqueous dispersion a water-soluble compound of silicon in an amount of from 0.2 to 2.0% by weight expressed as $SiO_2$ on the weight of titanium dioxide in the pigment. Preferably the amount of the water-soluble compound of silicon added if from 0.3 to 0.7% by weight as $SiO_2$ on the weight of titanium dioxide in the pigment. Typical compounds of silicon which can be employed are the alkali metal silicates such as sodium silicate, and usually the water-soluble compound of silicon is added in the form of an aqueous solution.

The water-soluble compound of silicon is added over a period of say 5 to 30 minutes, and after the completion of addition the dispersion is agitated for a further period to ensure homogenity. The pH of the aqueous dispersion so obtained is then adjusted to a value in the range of from 3.5 to 4.5, and mixing continued for a further period of from 2 to 10 minutes as required. This adjustment of the pH is usually effected by adding to the aqueous dispersion an alkali hydroxide or a carbonate in an amount sufficient to produce the desired pH. Preferably the pH of the aqueous dispersion is adjusted to a value of about 4.0.

It is believed that after the addition of the water-soluble compounds of phosphorus, aluminium, zirconium, titanium and silicon, and adjustment of the pH to a value of from 3.5 to 4.5 there becomes associated with the pigmentary particles of titanium dioxide a hydrous oxide of aluminium, zirconium, titanium and silicon and a phosphate. It is believed that during the process the particles of pigmentary titanium dioxide become coated with these hydrous oxides and phosphate, but it may be that there is also precipitated into association with the pigment one or more metal silicates.

Subsequently to the adjustment of the pH of the dispersion to a value of 3.5 to 4.5 there is then added to the dispersion a water-soluble compound of phosphorus in an amount of from 0.2 to 1.0% by weight expressed as $P_2O_5$ on the weight of $TiO_2$ in the pigment. Suitable compounds of phosphorus are phosphoric acid or water-soluble salts of phosphoric acid, and particularly useful is an alkali metal dihydrogen phosphate such as sodium dihydrogen phosphate. Preferably the amount of the water-soluble compound of phosphorus is from 0.4 to 0.7% by weight expressed as $P_2O_5$ on the weight of titanium dioxide in the pigment, and usually the compound is added in the form of an aqueous solution over a period of say 5 to 15 minutes at the completion of which agitation of the aqueous dispersion is continued for a further period of say 2 to 10 minutes.

To the aqueous dispersion so obtained there is added an alkaline reacting water-soluble compound of aluminium in an amount of from 0.5 to 1.5% by weight expressed as $Al_2O_3$ based on the weight of titanium dioxide in the pigment. Preferably the amount of the alkaline reacting water-soluble compound of aluminium is from 0.8 to 1.2% by weight $Al_2O_3$. Typical alkaline reacting water-soluble salts which on hydrolysis precipitates a hydrous oxide of aluminium are the alkali metal aluminates such as sodium aluminate. Usually the water-soluble salts of aluminium is added in the form of an aqueous solution, and if desired can contain an alkali such as sodium hydroxide. The solution of the alkaline reacting aluminium compound is added over a period of say 5 to 20 minutes and subsequent to addition the aqueous dispersion is agitated for a period of say 10 to 50 minutes.

The aqueous dispersion obtained after the addition of the water-soluble compound of phosphorus and the alkaline reacting water-soluble compound of aluminium is usually alkaline in pH, and a mineral acid is then added to the aqueous dispersion to adjust the pH of the dispersion to a value of from 6.5 to 8. For instance, dilute sulphuric acid may be added to the aqueous dispersion to produce a pH of from 6.9 to 7.2. After the addition of the acid to the desired pH the dispersion is agitated to allow the pH to stabilise at the chosen value.

The aqueous dispersion is filtered and the pigment recovered is washed and dried. Usually the pigment is then milled in a fluid energy mill and if desired may be treated with one or more organic coating agents such as an amine, an alkanolamine or a polyol.

Pigments obtained by the process of the present invention are particularly useful for the manufacture of paints, and when so used particularly in oleoresinous paints have a reduced photochemical activity, i.e. reduced chalking, improved gloss retention and reduced weight loss from the paint film.

The invention is illustrated in the following Examples.

EXAMPLE 1

A 2156g sample of dry milled, alumina (0.13%) additioned, rutile "sulphate" titanium dioxide base pigment was suspended in 2326 mls of distilled water, 154 mls of sodium hexametaphosphate (7.0% $P_2O_5$) solution were added and the pH of the slurry was raised to 9.0 by addition of 2.75M sodium hydroxide. 5140mls of Ottawa sand were added to the slurry which was then milled for 60 minutes in an 8 inches diameter pot with 4 × 5 inches discs (separation 1.5 inches) at 1890 r.p.m. The sand was separated from the pigment by passing the pigment successively through a 100 mesh and then a 325 mesh sieve, 900g of the sand-free slurry were taken, diluted to 200 grains per liter with distilled water, stirred to ensure efficient mixing during subsequent reagent additions and heated to 45° C. The pH at this stage was 8.9. 370 mls of a mixed acidic solution of aluminium sulphate, zirconium orthosulphate and titanyl sulphate (7.3% $Al_2O_3$, 2.4% $ZrO_2$ and 5.4% $TiO_2$) were added at a rate of 12.33 mls per minute and mixed for 10 minutes. At this stage the pH was 1.1. 45 mls of a solution of sodium silicate (10.0% $SiO_2$ and 3.18% $Na_2O$) was added at a rate of 9 mls per minute and mixed for 5 minutes. The pH at this stage was 1.2.

The slurry pH was adjusted to 4.0 with 2.75M sodium hydroxide over 10 minutes then mixed for a further 5 minutes. 45 mls of sodium dihydrogen phosphate solution (10.0% $P_2O_5$) were added at a rate of 9 mls per minute and mixed for 5 minutes. The pH at this stage was 3.8. 99 mls of caustic sodium aluminate solution (9.1% $Al_2O_3$ and 19.4% $Na_2O$) were added at a rate of 9.9 mls per minute and mixed for 30 minutes. The pH at this stage was 8.4. The pH of the slurry was reduced to 7.0 with 1.9M sulphuric acid and maintained at this pH for 15 minutes mixing.

The treated titanium dioxide was recovered by filtration. The filter cake was washed twice with distilled water, reslurried is distilled water, refiltered and again washed twice. The pigment was dried for 16 hours at 105° C then fluid energy milled in a laboratory 6 inches air microniser.

The pigment so obtained was incorporated in a stoving paint based on a thermoplastic acrylic resin with a pigment:binder ratio of 0.5:1. Coated stainless steel panels were prepared, stoved at 120° C for 30 minutes, tested in a Marr Weatherometer for various periods of time. The durability expressed as Gloss reading (G) and Chalk rating (C) were taken.

The results are compared with those of a control being similar paint containing a titanium dioxide pigment having acceptable properties and having a coating of hydrous titania (1% by weight as $TiO_2$), hydrous alumina (2.5% $Al_2O_3$ by weight) and hydrous silica (1.5% $SiO_2$) are prepared by a conventional method.

The pigment was also incorporated in a stoving paint based on a thermosetting acrylic resin system with a pigment/binder ratio of 1.0:1.0. Coated stainless steel panels were prepared, stoved at 120° C for 30 minutes and tested in a Marr Weatherometer. The durability expressed as Gloss reading (G) and Chalk rating (C) were determined. Similar paints containing a titanium dioxide pigment having a coating of hydrous titania (1% by weight as $TiO_2$), hydrous alumina (2.5% $Al_2O_3$ by weight) and hydrous silica (1.5% $SiO_2$) were prepared and tested as the control.

The pigment was also tested to determine their stoving gloss after baking at different temperatures in an alkyd/urea-formaldehyde stoving system, and compared with those obtained using a titanium dioxide pigment coated with alumina 6% as $Al_2O_3$ and 1 to 2% $TiO_2$.

The results of these tests are shown below.

TABLE 1

| Example | Test | Durability in thermoplastic acrylic resin After Time (Hours) | | | | | |
|---|---|---|---|---|---|---|---|
| | | Initial | 250 | 500 | 750 | 1000 | 1250 |
| 1 | G | 97 | 86 | 90 | 81 | 76 | 71 |
| | C | 10 | 9 | 9 | 9 | 9 | 9 |
| Control | G | 93 | 92 | 88 | 70 | 57 | 38 |
| | C | 10 | 9 | 9 | 9 | 9 | 8 |

TABLE 2

| Example | Test | Durability in thermosetting acrylic resin After Time (Hours) | | | | | |
|---|---|---|---|---|---|---|---|
| | | Initial | 250 | 500 | 750 | 1000 | 1250 |
| 1 | G | 90 | 83 | 73 | 55 | 48 | 22 |
| | C | 10 | 9 | 9 | 9 | 9 | 9 |
| Control | G | 90 | 84 | 49 | 31 | 19 | 11 |
| | C | 10 | 9 | 9 | 8 | 7 | 6 |

TABLE 3

| | Stoving gloss | |
|---|---|---|
| Example | normal schedule 120° | overbake schedule 180° |
| 1 | 75.5 | 21.0 |
| Control | 67.0 | 16.5 |

EXAMPLE 2

A 2156 gram sample of dry milled rutile $TiO_2$ "sulphate" based pigment was suspended in 2355 mls of distilled water. To the suspension was added 154 mls of sodium hexametaphosphate (7% $P_2O_5$) solution and 5140 mls of Ottawa sand. The slurry was sand-milled for 60 minutes in an 8 inches diameter pot with 4 × 5 inches diameter discs (separation 1.5 inches) at 1890 r.p.m. The sand was separated from the pigment by passing the slurry successively through a 100 mesh and then a 325 mesh sieve.

The sand-free slurry was diluted to 4.54 liters at 220 g/l $TiO_2$ with distilled water, stirred to ensure efficient mixing during subsequent reagent additions, and heated to 45° C. The pH at this stage was 8.5.

705 mls of an acidic solution of aluminium sulphate, zirconium nitrate, and titanyl sulphate (4.3% $Al_2O_3$, 1.4% $ZrO_2$, 3.6% $TiO_2$) were added at a rate of 35 mls per minute. The slurry was mixed for 10 minutes and the pH at the end of this stage was 0.9. 23.3g of a potassium silicate solution (21.3% $SiO_2$) were added at a rate of 2.3 grams per minute and mixed for 10 minutes. The pH at the end of this stage was 1.0.

The slurry pH was changed over 10 minutes to pH 4.0 with 3.6M KOH and mixed for 5 minutes.

70 mls of sodium hexametaphosphate (7% $P_2O_5$) were added at a rate of 15 mls per minute and the slurry mixed for 10 minutes. The pH at the end of this stage was 4.1.

143 mls of caustic sodium aluminate (8.2% $Al_2O_3$ and 19.4% $Na_2O$) were added at a rate of 7.6 mls per minute and the slurry was mixed for a further 20 minutes. The pH at the end of this stage was 10.0.

The pH of the slurry was changed over 30 minutes to pH 7.0 with 10% v/v sulphuric acid.

The treated titanium dioxide pigment was separated from the slurry by filtration, washed twice with distilled water, reslurried in distilled water, again filtered and washed twice additioned with triethanolamine (0.4% on $TiO_2$) then dried for 16 hours at 105° C. The dried pigment was fluid energy milled in a laboratory 8 inches steam microniser.

The pigment so obtained was tested as described in Example 1 (with in addition stoving colour).

The results are given in the following Tables.

TABLE 4

| Example | Test | Durability in thermoplastic acrylic resin After Time (Hours) | | | | | |
|---|---|---|---|---|---|---|---|
| | | Initial | 250 | 500 | 750 | 1000 | 1250 |
| 2 | G | 88 | 81 | 66 | 59 | 56 | 49 |
| | C | 10 | 10 | 10 | 10 | 9 | 9 |
| Control | G | 86 | 84 | 45 | 34 | 9 | 2 |
| | C | 10 | 10 | 10 | 9 | 6 | 6 |

TABLE 5

| Example | Test | Durability in thermosetting acrylic resin After Time (Hours) | | | | | |
|---|---|---|---|---|---|---|---|
| | | Initial | 250 | 500 | 750 | 1000 | 1250 |
| 2 | G | 87 | 80 | 72 | 50 | 24 | 11 |
| | C | 10 | 10 | 10 | 9 | 9 | 9 |
| Control | G | 88 | 74 | 46 | 20 | 9 | 4 |
| | C | 10 | 10 | 10 | 6 | 6 | 6 |

TABLE 6

| | Stoving gloss | | Stoving colour | |
|---|---|---|---|---|
| Example | normal schedule 120° | overbake schedule 180° | before UV exposure | after UV (1 hour) |
| 2 | 76.0 | 19.0 | + ¼ | + ¼ |
| Control | 67.0 | 16.5 | std* | std |

*std = standard
+ ¼ = improved

What is claimed is:

1. A process for the treatment of titanium dioxide pigment which comprises forming an aqueous dispersion of pigmentary titanium dioxide containing a water-soluble compound of phosphorus in an amount of from 0.2 to 1.0% by weight expressed as $P_2O_5$, adding to the dispersion so formed an acidic water-soluble compound of aluminium in an amount of from 2.5 to 3.5% by weight expressed as $Al_2O_3$, a water-soluble acidic compound of zirconium in an amount of from 0.5 to 1.5% by weight expressed as $ZrO_2$, an acidic water-soluble compound of titanium in an amount of from 1.5 to 3% by weight expressed as $TiO_2$ and a water-soluble compound of silicon in an amount of from 0.2 to 2.0% by weight expressed as $SiO_2$, adjusting the pH of the dispersion to a value of from 3.5 to 4.5 and then adding to the dispersion a water-soluble compound of phosphorus in an amount of from 0.2 to 1.0% by weight expressed as $P_2O_5$ and an alkaline reacting water-soluble compound of aluminium in an amount of from 0.5 to 1.5% by weight expressed as $Al_2O_3$, with all the percentages by weight being based on the weight of $TiO_2$ in the pigment, and adding to the dispersion a mineral acid to adjust the pH to a value of 6.5 to 8 and recovering the treated pigment.

2. A process according to claim 1 in which the aqueous dispersion of pigmentary titanium dioxide is formed from calcined titanium dioxide.

3. A process according to claim 1 in which the titanium dioxide contains at least 95% to its $TiO_2$ content in the rutile form.

4. A process according to claim 1 in which the titanium dioxide contains from 0.1 to 0.5% by weight $Al_2O_3$ based on the weight of $TiO_2$.

5. A process according to claim 1 in which the aqueous dispersion containing the water-soluble compound of phosphorus is wet milled.

6. A process according to claim 5 in which the aqueous dispersion additionally contains an alkali in sufficient amount to render the aqueous dispersion alkaline.

7. A process according to claim 5 in which the concentration of pigmentary titanium dioxide in the aqueous dispersion at the conclusion of milling is from 600 to 1000 grams per liter.

8. A process according to claim 7 in which the aqueous dispersion is diluted after wet milling to a concentration of from 150 to 250 grams per liter $TiO_2$.

9. A process according to claim 1 in which the amount of the acidic water-soluble compound of aluminium added to the aqueous dispersion is from 2.8 to 3.2% by weight expressed as $Al_2O_3$.

10. A process according to claim 9 in which the acidic aluminium compound is aluminium sulphate.

11. A process according to claim 1 in which the acidic water-soluble compound of zirconium is added to the aqueous dispersion in an amount of from 0.8 to 1.2% by weight expressed as $ZrO_2$.

12. A process according to claim 1 in which the acidic water-soluble compound of titanium is added to the slurry in an amount of from 1.8 to 2.4% by weight expressed as $TiO_2$.

13. A process according to claim 1 in which the acidic water-soluble compounds of aluminium, titanium and zirconium are added to the aqueous dispersion in the form of a mixed aqueous solution.

14. A process according to claim 13 in which the mixed aqueous solution contains aluminium sulphate, titanyl sulphate and zirconium sulphate and has a pH of from 0.7 and 1.2.

15. A process according to claim 1 in which the water-soluble compound of silicon is added in an amount of from 0.3 to 0.7% by weight expressed as $SiO_2$.

16. A process according to claim 15 in which the pH of the aqueous dispersion is then adjusted to a value of about 4.

17. A process according to claim 1 in which after the adjustment of the pH of the aqueous dispersion to a value of 3.5 to 4.5 there is added to the aqueous dispersion the water-soluble compound of phosphorus in an amount of from 0.4 to 0.7% by weight expressed as $P_2O_5$.

18. A process according to claim 1 in which the amount of the alkaline water-soluble compound of aluminium is from 0.8 to 1.2% by weight expressed as $Al_2O_3$.

19. A process according to claim 1 in which the treated pigment, after recovery, is milled in a fluid energy mill.

20. A process according to claim 19 in which the pigment is treated with an amine, alkanolamine or polyol during milling.

* * * * *